(No Model.)
E. W. FLYNN.
IMPLEMENT FOR CHIPPING ICE.
No. 475,978.   Patented May 31, 1892.
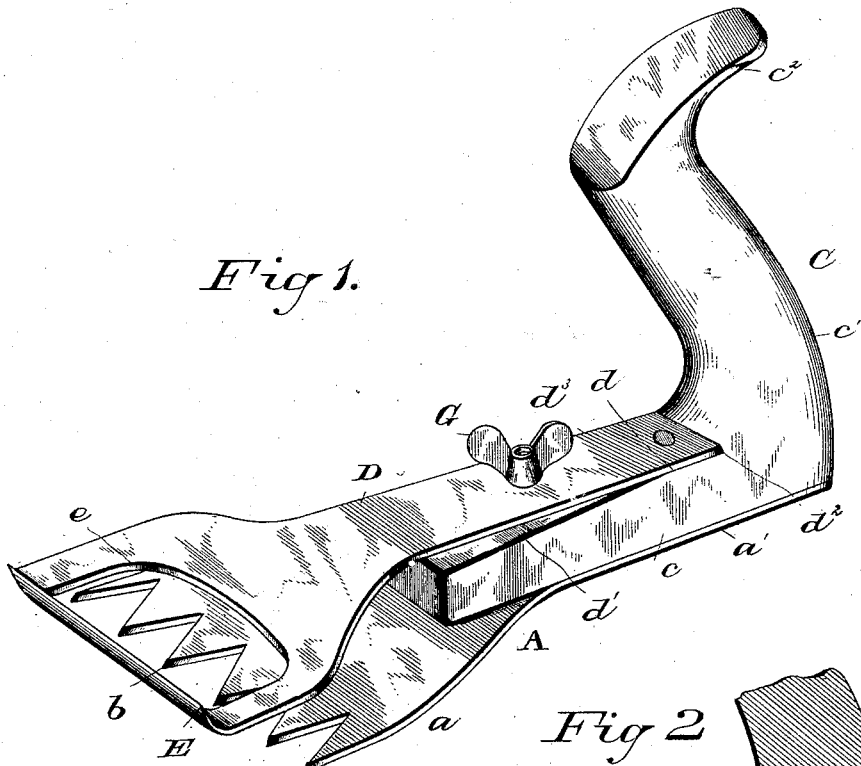
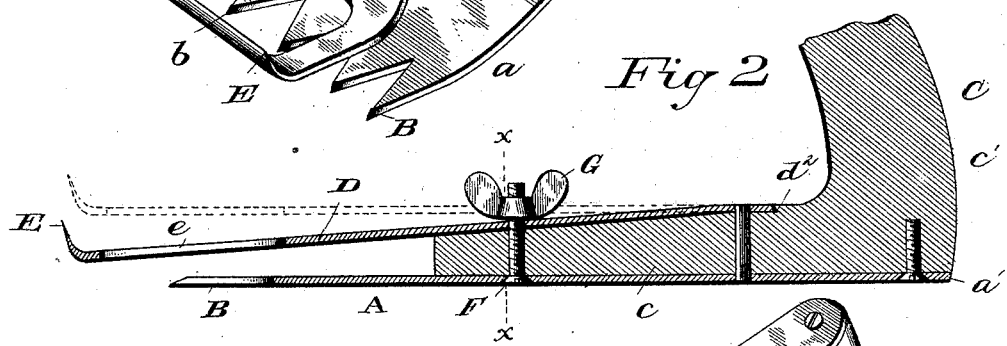
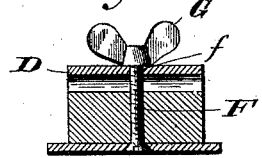
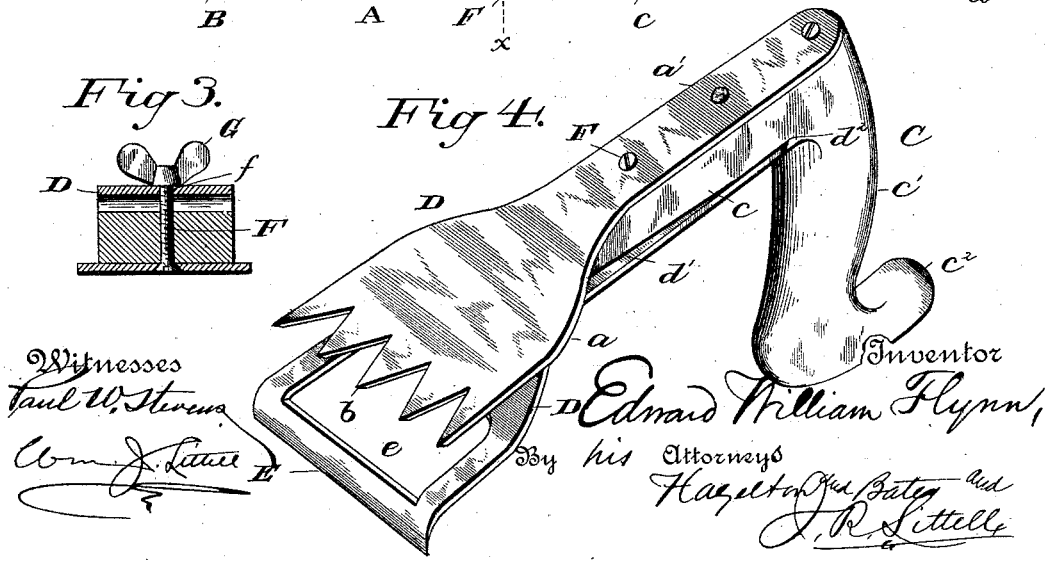
Witnesses
Paul W. Stevens
Inventor
Edward William Flynn
By his Attorneys

UNITED STATES PATENT OFFICE.

EDWARD WILLIAM FLYNN, OF CLINTON, IOWA.

IMPLEMENT FOR CHIPPING ICE.

SPECIFICATION forming part of Letters Patent No. 475,978, dated May 31, 1892.

Application filed December 29, 1891. Serial No. 416,409. (No model.)

*To all whom it may concern:*

Be it known that I, EDWARD WILLIAM FLYNN, a citizen of the United States, residing at Clinton, in the county of Clinton and State of Iowa, have invented certain new and useful Improvements in Implements for Chipping Ice; and I do hereby declare the following to be a full, clear, and exact description of the invention, such as will enable others skilled in the art to which it appertains to make and use the same.

This invention relates to implements for chipping ice of that class employing a cutter and a guard therefor; and it has for its object to provide a simple and improved article of this character embodying adjusting means whereby the implement is adapted for cutting chips of the desired size from a block of ice.

A further object of the invention is to provide a new and practical implement for the purpose intended which will possess advantages in point of durability, inexpensiveness, ease of operation, and general efficiency.

In the drawings, Figure 1 is a perspective view of an implement embodying my invention. Fig. 2 is a vertical longitudinal sectional view thereof, the adjustment of the guard or guide being illustrated in dotted lines. Fig. 3 is a transverse sectional view on the line $x\ x$, Fig. 2. Fig. 4 is a perspective view illustrating the operation of the scraper.

Corresponding parts in the figures are denoted by the same letters of reference.

Referring to the drawings, A designates a flat metallic plate, preferably formed of steel and consisting of a body portion $a$, from which extends rearwardly a contracted arm $a'$. At the forward edge of the portion $a$ is provided a series of cutting or chipping teeth B. In practice the latter are preferably V-shaped and beveled from the upper face of the plate, as shown at $b$. The construction and number of teeth, however, are immaterial to the carrying out of my invention, and in lieu of the form of teeth shown any other desired shape or formation thereof may be employed.

C designates the handle, which is by preference constructed of wood and consists of a longitudinally-arranged flat-face portion $c$, rigidly secured to the upper face of the arm $a'$. From the rear end of the portion $c$ projects upwardly and slightly forwardly a curved handle portion $c'$. A rearwardly-curved shoulder $c^2$ is provided at the upper end of the latter and which serves the purpose of preventing accidental disengagement of the hand of the operator from the handle while manipulating the implement.

The upper side of the portion $c$ of the handle is formed with a seat $d$, contiguous to the handle portion $c'$, and from said seat the portion $c$ is beveled forwardly to its extreme forward end, as shown at $d'$. The shoulder formed at the rear edge of the seat $d$ is also beveled inwardly, as shown at $d^2$. Within the seat $d$ is rigidly secured the extreme rear end of a spring-guard D, said secured end being downwardly beveled to conform to the beveled shoulder $d^2$.

The guard D is constructed of any suitable spring metal and comprises a rearwardly-projecting arm $d^3$. At the forward end of the arm $d^3$ the guard is formed flaring at its sides, and said flaring portion is curved upwardly at its outer edge and sharpened to provide a scraper E. A recess $e$ is provided in the flaring portion of the guard D, as shown, to form a free outlet for the chipped ice.

The guard D, when in normal position, is parallel with the cutter A, and when in such normal position it is adapted to be adjusted nearer to the cutter, such adjustment being rendered permissible by reason of the recess formed by the beveled top surface of the portion $c$ of the handle. To effect adjustment of the guard D a screw or bolt F is passed vertically through the plate A, the forward end of the portion $c$ of the handle, and through an aperture $f$ therefor in the arm of the guard, the head of the screw or bolt being countersunk in the plate A. Upon the threaded projecting end of the screw or bolt is applied a thumb-nut G, by the tightening or loosening of which the guard is respectively brought nearer to or farther from the cutting or chipping teeth B.

The operation and advantages of my invention will be readily understood by those skilled in the art to which it appertains. When coarsely-chipped ice is desired, the guard D is permitted to occupy its normal position—*i. e.*, at its farthest point from the cutting-teeth. For cutting smaller or finer chippings the thumb-nut is tightened to bring the guard nearer to the cutting-teeth, thus preventing the latter from entering so deeply into the block of ice. After the requisite quantity of ice has been chipped the implement is reversed and the chipped ice removed and deposited into a receptacle by means of the scraper E.

I claim as my invention—

1. In an implement of the class described, the combination, with a cutting-plate, of a guard-plate located above the same and approximately parallel therewith and having its outer end adjustable to or from the cutting-plate to regulate the space between the cutting-edge of the latter and the guard-plate, substantially as and for the purpose set forth.

2. In an implement of the class described, the combination, with a flat plate provided at its forward end with cutting-teeth, of a spring or yielding guard-plate located above the cutting-plate and normally parallel therewith, and means for adjusting said guard-plate nearer to the cutting-plate, substantially as set forth.

3. In an implement of the class described, the combination, with a flat plate provided at its forward edge with cutting-teeth and a handle having a longitudinally-disposed base portion secured at the upper face of said plate and having its upper side formed with a seat and beveled forwardly from the latter, of a spring or yielding guard-plate having its rear end rigidly secured in said seat and provided in advance of its secured end with an aperture, a rigid screw or bolt projecting through said aperture, and a thumb-nut disposed upon the projecting threaded end of the screw or bolt, substantially as set forth.

4. In an implement of the class described, the combination, with a cutter, of a guard-plate disposed above said cutter and having its forward edge curved upwardly and sharpened to form a scraper, substantially as set forth.

5. In an implement of the class described, the combination, with a handle having a forwardly-projecting base portion formed with a seat upon its upper side and beveled from said seat to its extreme forward end and a flat plate rigidly secured to the under side of said base and provided at its forward end with cutting-teeth, of a spring or yielding guard-plate rigidly secured at its rear end in said seat and having its outer edge curved upwardly and sharpened for the purpose described, said plate being recessed in rear of the latter, a screw or bolt passed upwardly through the cutting-plate and the forward end of the handle-base and projecting through an aperture in the guard-plate, and a thumb-nut disposed upon the projecting threaded end of the screw or bolt, substantially as set forth.

In testimony whereof I have affixed my signature in presence of two witnesses.

EDWARD WILLIAM FLYNN.

Witnesses:
WM. J. KEEFE,
ARTHUR BRIGGS.